UNITED STATES PATENT OFFICE.

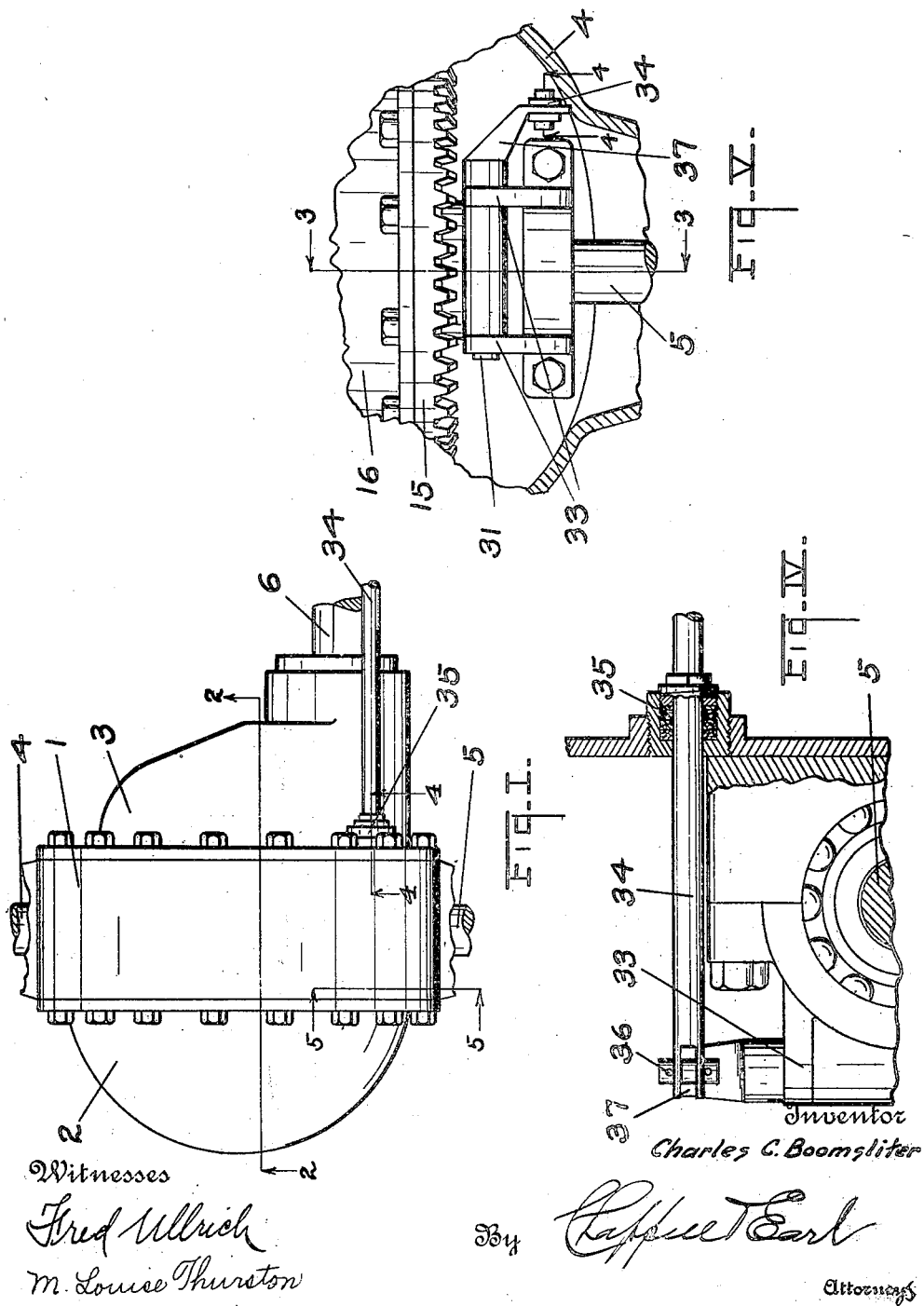

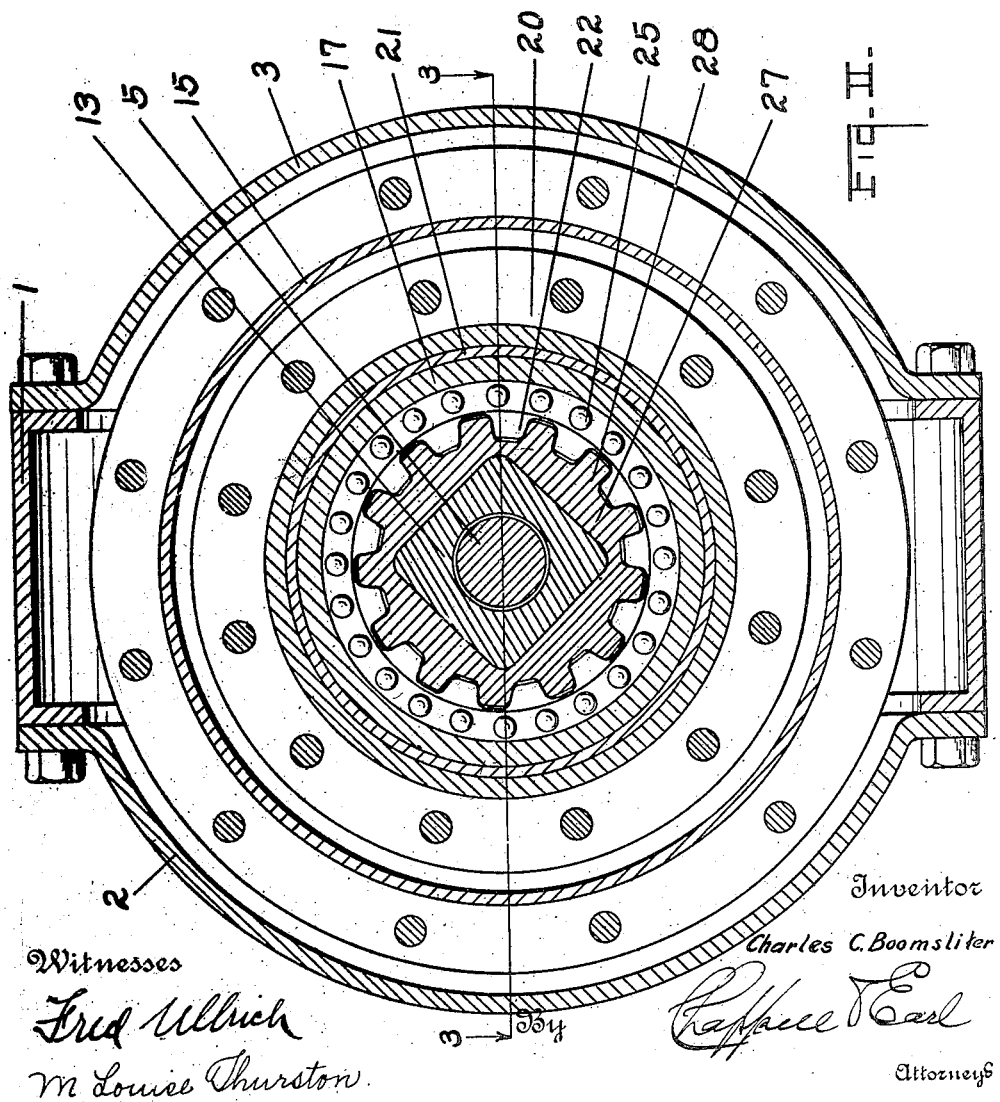

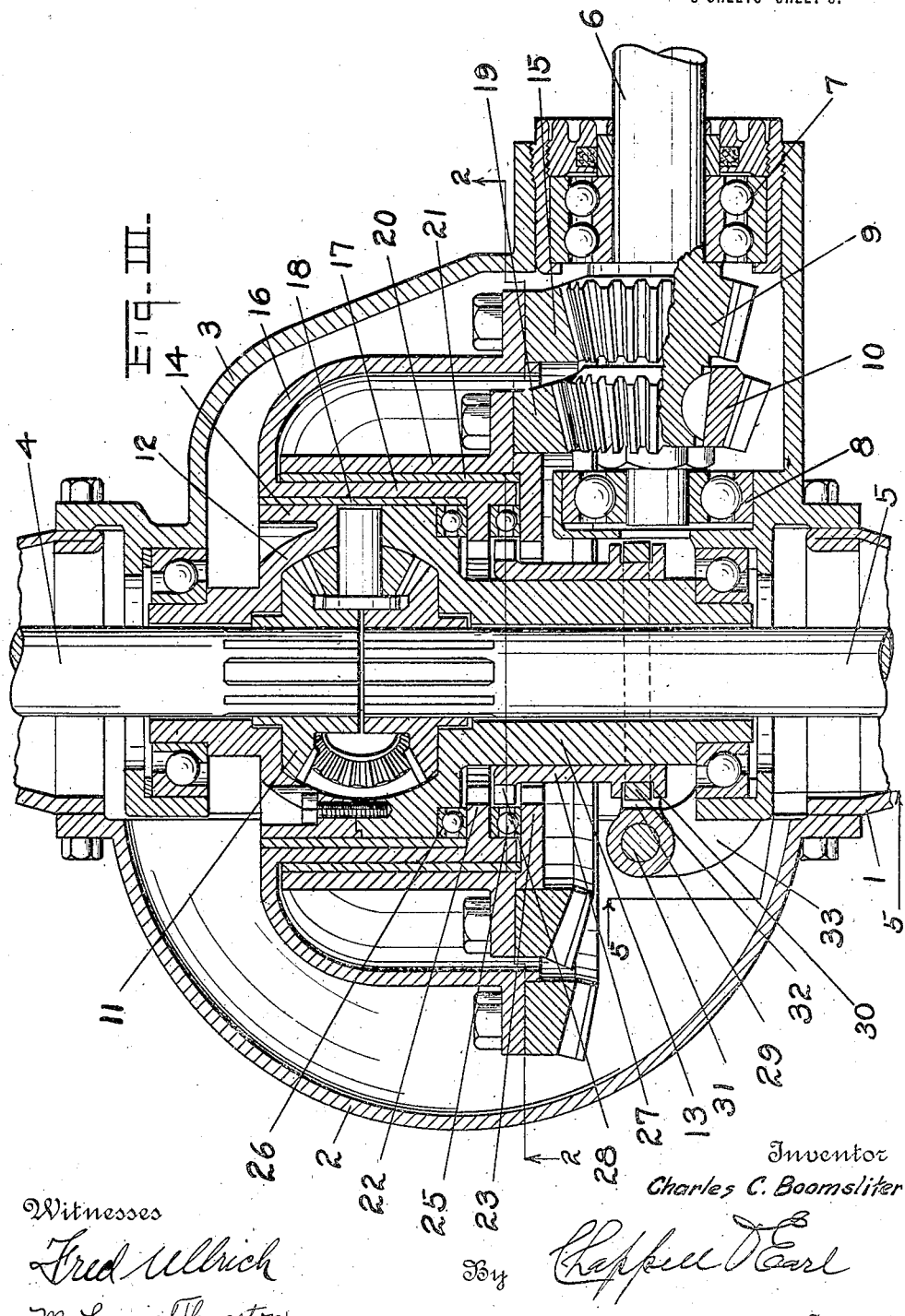

CHARLES C. BOOMSLITER, OF GRAND RAPIDS, MICHIGAN, ASSIGNOR OF ONE-THIRD TO NICHOLAS KIK, OF GRAND RAPIDS, MICHIGAN.

CHANGEABLE GEAR FOR AUTOMOBILES.

1,379,675.    Specification of Letters Patent.    Patented May 31, 1921.

Application filed May 6, 1920. Serial No. 379,305.

*To all whom it may concern:*

Be it known that I, CHARLES C. BOOMSLITER, a citizen of the United States, residing at Grand Rapids, county of Kent, State of Michigan, have invented certain new and useful Improvements in Changeable Gears for Automobiles, of which the following is a specification.

This invention relates to improvements in changeable gears for automobiles.

The object of the invention specifically is to provide a double direct drive for the rear axle of an automobile.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is fully illustrated in the accompanying drawing, forming a part of this specification, in which:

Figure I is a detail plan view of the differential and rear axle, embodying my invention, the ends of the axles being broken away.

Fig. II is a vertical transverse sectional elevation view through the axle and gearing, taken on line 2—2 of Figs. I and III, the line being somewhat irregular, as seen in Fig. III.

Fig. III is an enlarged detail longitudinal sectional plan view taken on line 3—3 of Figs. II and V.

Fig. IV is an enlarged detail elevation view, taken on line 4—4 of Figs. I and V, showing details of the connecting rod to shift the clutch to change from the high to the low gear, or to throw out of gear.

Fig. V is an enlarged detail elevation view from the rear, showing further detailed view of the connecting means for the clutch, the axle housing being shown in section on line 5—5 of Figs. I and III.

In the drawings the sectional views are taken looking in the direction of the little arrows at the ends of the section lines and similar numerals of reference refer to similar parts throughout the several views.

Considering the numbered parts of the drawing, 1 is the rear axle housing. 2 is the hemispherical rear cap of the differential and change gear housing. 3 is the front housing for the differential and the change gear. 4 and 5 are parts of the divided axle. 6 is the driving pinion shaft which is supported in suitable bearings 7 and 8, the bearing 8 being at its inner end. The propeller shaft of the automobile connects here. The pinion shaft 6 carries a pair of pinions 9 and 10, the outer one 9 being the smaller of the two. 11 is the usual differential gear. 12 is the casing therefor and 13 is the elongated squared or splined hub to carry the shiftable member of the clutch. 14 is a peripheral shell around the differential gear, constituting a journal. On this journal 14 the outer driving gear 15 is journaled. Outer driving gear 15 meshes with pinion 9 and is supported on a shell 16 which extends into an internal hub or journal 17, which embraces the outside of the differential casing 14 and is supported thereon as on a recessed hub, a bushing 18 being interposed.

19 is the second or inner driven gear meshing with the inner pinion 10. This is supported upon a sleeve-like hub 20 having a journal bearing on the outside of the sleeve 17. The bushing 21 is interposed therebetween.

The sleeve 20 has an inwardly-projecting internally-toothed clutch ring 22 and the outer sleeve 21 has an inwardly-projecting internally-toothed clutch ring 23, preferably formed integrally therewith. Thrust bearings 25 and 26 are interposed between these clutch rings and the side of the differential housing. A sliding sleeve 27 is on the square differential hub 13 and carries the outwardly projecting clutch teeth or jaws at 28 disposed to coöperate with the internal teeth of the aforesaid clutch rings. This sleeve 27 is provided with an annular groove 29 in which is disposed a ring 30 which is controlled by the rocker 32 carried on the rock shaft 31. The rock shaft 31 is supported on a pair of brackets 33. An arm 37 (see Figs. IV and V) is connected to the control rod 34. The rod 34 extends through a suitable stuffing box 35 (see Figs. I and IV) and is connected by pin 36 to the forked end of the arm 37.

The differential is carried by the usual ball bearings at each end, any suitable bearing support being contemplated.

The operation of the parts will be readily understood from this description. This structure has the low gear on the outside, and by the arrangement of devices a very compact and strong structure is produced. When it is desired to run the car on the low gear, the control rod 34 is pulled out and it reacts through the arm 37 which is engaged by the cross pin 36. This acts upon the clutch 27, shifting it toward the differential casing and throwing the jaws into engagement with the internal jaw 22, thereby transmitting the motion from the pinion 9 on the outside through the differential to the rear axle in the usual way. The pinion 10 of course continues to revolve and drives the gear 19 at a slightly different rate, the hub 20 of the same revolving upon the bronze bushing 21 and traveling freely and idly in place without any undue friction because no work is being done. The movement is relatively slight because both gears are revolving in the same direction.

When it is desired to travel on the high speed, the control 34 is pushed in, the action is reversed, and the clutch sleeve 27 is pulled until its jaws engage with the outer clutch jaw 23, whereupon the rear axle is driven by the pinion 10 which, being engaged by the clutch, drives the axle at high speed. The outer pinion 9 is still in gear with the outer driven gear 15 and revolves the same idly without doing any work within the hub 20. Because the parts are supported by the thrust bearing at the ends, there is very little friction occasioned by any side play and the movement is even and true. The movement is only relative and comparatively slow between the parts.

I have not described in detail the differential gear or in detail the particular manner of supporting the different ball bearings, because these do not pertain to my invention, and I use the usual adjustable devices for this purpose. This two-speed axle is intended for use with the usual gear box of automobiles, whether the same is housed in the rear axle or separately.

I desire to say that I have embodied my invention in a preferred form and desire to claim it specifically. I also desire to claim the invention broadly, as indicated and pointed out in the appended claims.

Having thus described my invention, what I claim as new and desire to secure by Letters Patent is:

1. In a two-speed rear axle structure, the combination with the differential, a casing for the differential formed into a journal on the outside and having a square hub, a pinion shaft with outside and inside driving pinions secured thereto, an outside and inside driven gear meshing with and corresponding to said pinions, and operable separately thereby, a hollow shell constituting a recessed hub secured to the outer gear, with a bearing sleeve embracing the journal bearing surface on the periphery of said differential, an inwardly-projecting internally-toothed clutch member carried by said sleeve, thrust bearings between the said clutch member and the said differential casing, an inner gear meshing with the inner pinion, provided with a hub-like bearing sleeve extending into the shell or recess of the outer bearing hub and suitably journaled therein, an internally-toothed clutch ring carried thereby and disposed parallel to said outer gear clutch ring, a thrust bearing between the said clutch rings, a shifting clutch member having outwardly-projecting teeth slidably adjustable on the square hub and rotated thereby, disposed to coact with the clutch rings to throw into or out of gear either the inner or the outer gear, and outside connections to said shifting clutch member, all coacting substantially as described for the purpose specified.

2. In a two-speed rear axle structure, the combination with the differential, a casing for the differential formed into a journal on the outside and having a hub, a pinion shaft with outside and inside driving pinions secured thereto, an outside and inside driven gear meshing with and corresponding to said pinions, and operable separately thereby, a hollow shell constituting a recessed hub secured to the outer gear, with a bearing sleeve embracing the journal bearing surface on the periphery of said differential casing, an inwardly-projecting internally-toothed clutch member carried by said sleeve, thrust bearings between the said clutch member and the said differential casing, an inner gear meshing with the inner pinion, provided with a hub-like bearing sleeve extending into the shell or recess of the outer bearing hub and suitably journaled therein, an internally-toothed clutch ring carried thereby and disposed parallel to said outer gear clutch ring, a thrust bearing between the said clutch rings, a shifting clutch member having outwardly-projecting teeth slidably adjustable on the said hub and rotated thereby, disposed to coact with the clutch rings to throw into or out of gear either the inner or the outer gear, and outside connections to said shifting clutch member, all coacting substantially as described for the purpose specified.

3. In a two-speed rear axle structure, the combination with the differential, a casing for the differential formed into a journal on the periphery and having a hub, a pinion shaft with outside and inside driving pinions secured thereto, an outside and inside driven gear meshing with and corresponding to said pinions, and operable separately thereby, a hollow shell constituting a recessed hub secured to the outer gear, with a bearing sleeve embracing the journal bearing surface on the outside of said differential casing, an inner gear meshing with the inner pinion, provided with a hub-like bearing sleeve extending into the shell or recess of the outer bearing hub and suitably journaled therein, and a clutch to connect either the outer or inner driven gear to said differential, as described.

4. In a two-speed rear axle structure, the combination with the differential, a casing for the differential having a projecting hub, a pinion shaft with outside and inside driving pinions secured thereto, an outside and inside driven gear meshing with and corresponding to said pinions and operable separately thereby, the said outer gear being journaled upon the periphery of said differential casing, and an internally-toothed clutch member carried thereby, a journal bearing between the said outer and inner driven gears, an internally-toothed clutch ring carried by the said inner gear and disposed parallel to the corresponding clutch member carried by the outer gear, thrust bearings therebetween, a shifting clutch member having outwardly-projecting teeth slidably adjustable on the said hub and rotated thereby, disposed to coact with the clutch rings to throw into or out of gear either the inner or the outer gear, and outside connections to said shifting clutch member, as described.

5. In a two-speed rear axle structure, the combination with the differential, a casing for the differential having a projecting hub, a pinion shaft with outside and inside driving pinions secured thereto, an outside and inside driven gear meshing with and corresponding to said pinions and operable separately thereby, the said outer gear being journaled upon the periphery of said differential casing, and an internally-toothed clutch member carried thereby, a journal bearing between the said outer and inner driven gears, an internally-toothed clutch ring carried by the said inner gear and disposed parallel to the corresponding clutch member carried by the outer gear, a shifting clutch member having outwardly-projecting teeth slidably adjustable on the said hub and rotated thereby, disposed to coact with the clutch rings to throw into or out of gear either the inner or the outer gear, and outside connections to said shifting clutch member, as described.

6. In a two-speed rear axle structure, the combination with the differential, a pinion shaft with outside and inside driving pinions secured thereto, an outside and inside driven gear meshing with and corresponding to said pinions and operable separately thereby, a recessed sleeve secured to the said outer gear and journaled on the periphery of said differential casing, a sleeve on said inner gear journaled in the recess of the outer gear sleeve, and clutch means for clutching either of said driven gears to the differential, as specified.

7. In a two-speed axle structure, the combination of a casing comprising a cylindrical differential driving member having a hub at one end, the periphery of said driving member constituting a bearing, a pair of concentrically disposed driven gears, the outer of which is provided with a shell-like hub provided with a bearing sleeve journaled on said driven member of said differential, the inner of said gears being provided with a hub-like bearing sleeve journaled on the bearing sleeve of the outer gear, clutch members on the said bearing sleeves, a clutch member on said differential driving member adapted to connect either of said driven gears to said differential driving member, and a driving shaft having pinions thereon coacting with said driven gears.

8. In a two-speed axle structure, the combination of a differential driving member constituting a differential casing and provided with a peripheral bearing, a pair of concentrically disposed driven gears mounted on said bearing on said differential driving member and having bearings disposed concentrically of each other, clutch members for said driven gears, a coacting clutch member on said differential driving member, and a driving shaft provided with driving pinions coacting with said driven gears, all coacting for the purpose specified.

In witness whereof, I have hereunto set my hand and seal in the presence of two witnesses.

CHARLES C. BOOMSLITER. [L. S.]

Witnesses:
NICHOLAS KIK,
LUELLA G. GREENFIELD.